June 13, 1933.    R. K. LEE    1,913,935

VIBRATION DAMPER

Filed May 23, 1928

INVENTOR
ROGER K. LEE.
BY
Irving Harness
ATTORNEY.

Patented June 13, 1933

1,913,935

UNITED STATES PATENT OFFICE

ROGER K. LEE, OF DETROIT, MICHIGAN, ASSIGNOR TO CHRYSLER CORPORATION, OF DETROIT, MICHIGAN, A CORPORATION OF DELAWARE

VIBRATION DAMPER

Application filed May 23, 1928. Serial No. 279,924.

This invention relates to an impulse damper and more particularly to a damper for an internal combustion engine adapted to absorb torsional vibration.

An important object of my invention is to resiliently hold the upper portion of the engine in the direction of its power torque and to permit it to be free for angular movement to a limited extent in the direction opposite to its power torque.

Another object of the invention is to arrange the damper for movement on a horizontal line above the engine so that vertical vibration of the engine is not transmitted through the damper.

The above and other objects of my invention will more fully appear from the following description taken in connection with the accompanying drawing, in which.

Figure 1:
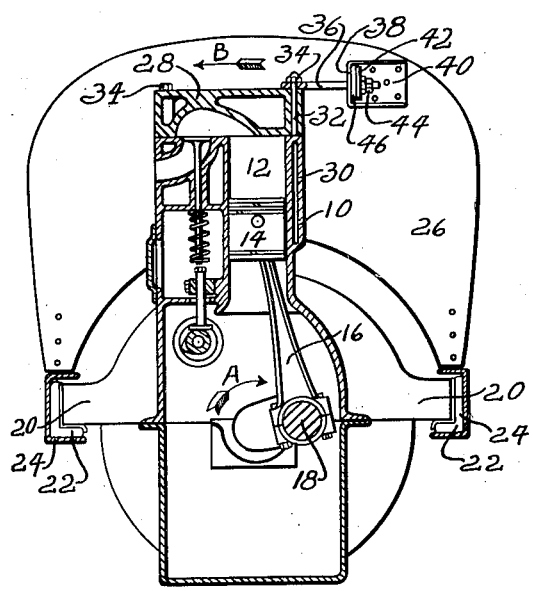
Fig. 1 is a sectional view through an internal combustion engine with my improved device attached thereto positioned in front of and on the body dash of an automobile.
Figure 2:
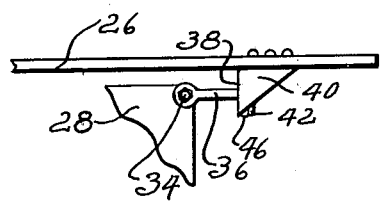
Fig. 2 is a fragmentary view showing a plan view of my improved damper.
Figure 3:
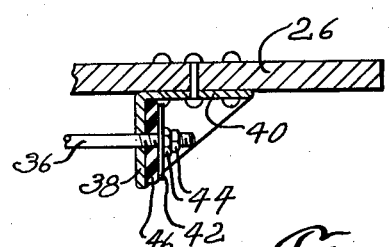
Fig. 3 is a sectional view through the damper on a larger scale.

Referring to the drawing wherein I have illustrated one practical application of my invention, an internal combustion engine has been shown at 10. The engine is provided with cylinders 12, pistons 14, connecting rods 16 and crankshaft 18. The crankshaft 18 rotates in a clockwise direction as indicated by the arrow A, due to the vertical reciprocation of the pistons 14 in the cylinders 12.

The engine is mounted by arms 20 in rubber blocks 22 supported in side frame members 24. An automobile body dash 26 is positioned on the frame side members. Due to the resilient mounting of the motor, it will be understood that the motor is to some extent free for relative movement with respect to the dash.

The engine 10 is also provided with a cylinder head 28 secured to the block 30 by studs 32 and nuts 34. Carried by one of the studs 32 and held in position on top of the cylinder head by its nut 34 is an arm 36 which extends through a flange 38 of a bracket 40 secured to the dash 26. An abutment in the form of a washer 42 is positioned on the outer end of the arm 36 by nuts 44. A resilient member, such as a block of rubber 46, is positioned between the flange 38 and the washer 42 to resiliently hold the arm and engine against angular movement in one direction and free for movement in the opposite direction.

In the operation of my improved device the engine 10 being mounted in rubber blocks 22 will move under the impulse of explosion. The vertical vibrations will be absorbed by the resilient mountings for the motor. The power torque of the engine creates a resultant force in the direction of the arrow B, tending to rotate the engine in a direction opposite to the direction of the force on a line indicated by the arrow A. The resultant force is cushioned or dampened out by the resilient block 46. Thus the damper prevents the power torque impulses of the engine from being transferred as synchronous vibrations to the body. The damper being located on a horizontal line and at the top of the engine does not effect the vertical forces of the engine.

Figure 4:
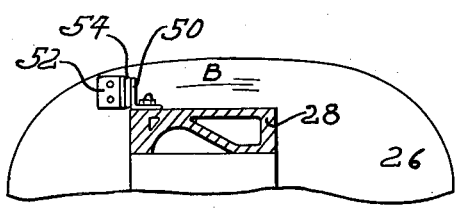
Fig. 4 is a fragmentary view, corresponding to a portion of Fig. 1 but showing a modified form of my invention.
Figure 5:
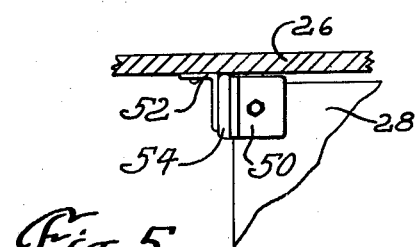
Fig. 5 is a plan view of Fig. 4, the dash being shown in section.

Referring to Figs. 4 and 5 wherein I have shown a modification of my improved damper, an angle bracket 50 is secured to the cylinder head 28 and an angle bracket 52 is secured to the dash 26 in such positions that flanges of the angle brackets are aligned to receive a resilient member 54 such as a rubber block between the adjacent faces of the flanges. In this form of the device the damper is shown at the opposite side of the engine but the rubber is compressed when the power torque move the engine in the direction of the arrow B and is free when the engine moves in the opposite angular direction.

It will be obvious that various changes may be made in the arrangement, combination and construction of the various parts of my improved device without departing from the spirit of my invention and it is my intention to cover by my claim such changes as may reasonably be included within the scope thereof.

What I claim is:

In a motor vehicle, the combination of an automobile body having a dash, an engine, an abutment on said dash, a member secured to said engine and extending through the first named abutment, and abutment on the outer end of said member, and a resilient member between said abutments around a portion of said member.

ROGER K. LEE.